(12) United States Patent
Chen et al.

(10) Patent No.: US 11,341,716 B1
(45) Date of Patent: May 24, 2022

(54) AUGMENTED-REALITY SYSTEM AND METHOD

(71) Applicant: Climax Technology Co., Ltd., Taipei (TW)

(72) Inventors: Yi-Kai Chen, Taipei (TW); Tang-Hui Liu, Taipei (TW); Chung-Yuan Huang, Taipei (TW)

(73) Assignee: Climax Technology Co., Ltd., Taipei (TW)

( * ) Notice: Subject to any disclaimer, the term of this patent is extended or adjusted under 35 U.S.C. 154(b) by 0 days.

(21) Appl. No.: 17/339,687

(22) Filed: Jun. 4, 2021

(51) Int. Cl.
| | |
|---|---|
| *G06T 15/20* | (2011.01) |
| *G06T 7/73* | (2017.01) |
| *G06T 13/20* | (2011.01) |
| *G06T 19/00* | (2011.01) |
| *G16Y 10/80* | (2020.01) |
| *G06F 3/0488* | (2022.01) |

(52) U.S. Cl.
CPC .............. *G06T 15/205* (2013.01); *G06T 7/75* (2017.01); *G06T 13/20* (2013.01); *G06T 19/006* (2013.01); *G06F 3/0488* (2013.01); *G06T 2200/24* (2013.01); *G16Y 10/80* (2020.01)

(58) Field of Classification Search
None
See application file for complete search history.

(56) References Cited

U.S. PATENT DOCUMENTS

| | | | |
|---|---|---|---|
| 11,024,069 B2 | 6/2021 | Chang et al. | |
| 2019/0311544 A1 | 10/2019 | Kayo et al. | |
| 2019/0385373 A1* | 12/2019 | Mittleman | .............. G06T 15/30 |
| 2021/0074073 A1 | 3/2021 | Mittleman et al. | |

FOREIGN PATENT DOCUMENTS

| | | |
|---|---|---|
| EP | 3736728 A1 | 11/2020 |

OTHER PUBLICATIONS

Extended European Search Report dated Dec. 6, 2021 in related European Application No. 21177950.9.

* cited by examiner

*Primary Examiner* — Robert J Craddock
(74) *Attorney, Agent, or Firm* — Donald E. Stout; Stout, Uxa & Buyan, LLP

(57) ABSTRACT

An augmented-reality system includes an image capture device that obtains a captured image, an image processing unit that receives and processes the captured image to determine space configuration of a scene; a user interface that receives a position of a fiducial point inputted by a user; and a rendering device that superimposes a fiducial mark at the position of the fiducial point on the captured image. The rendering device superimposes a first computer-generated image representing a sensor at an install height above the fiducial point and on a wall of the captured image.

20 Claims, 4 Drawing Sheets

AUGMENTED-REALITY SYSTEM AND METHOD

BACKGROUND OF THE INVENTION

1. Field of the Invention

The present invention generally relates to augmented reality, and more particularly to an augmented-reality system and method with enhanced user experience.

2. Description of Related Art

An infrared (IR) sensor, a millimeter wave (mmWave) sensor or a light detection and ranging (LiDAR) device may act as a motion sensor configured to detect a moving object such as a person. The sensor is commonly incorporated to a system to perform a specific task such as security, home control or energy (e.g., lighting) efficiency control.

When installing the sensor, an installer commonly uses a usual ruler or a laser pointer to measure proper height and location. In order to obtain a proper installation location, repeated efforts are required even for a skilled installer. Further, as a wide variety of manufacturers and models of sensors provide different parameters (e.g., install height and sensing coverage), it is ordinarily time-consuming to select a proper sensor.

Augmented reality (AR) is technology that combines real world with computer-generated information to enhance user's perception about the objects around the real world. Augmented reality is conventionally utilized to install sensors in smart home network or Internet of things. However, conventional AR system cannot accurately simulate installing a sensor on the wall for the reason that it is difficult to mount a three-dimensional object on a plain surface. Further, the installer cannot perceive relevance between install position and sensing coverage of the sensor by using the conventional AR system.

A need has thus arisen to propose a novel scheme to improve the conventional AR system while installing a sensor.

SUMMARY OF THE INVENTION

In view of the foregoing, it is an object of the embodiment of the present invention to provide an augmented-reality system and method capable of providing a user interface with enhanced user experience.

According to one embodiment, an augmented-reality system includes an image capture device, an image processing unit, a user interface and a rendering device. The image capture device obtains a captured image. The image processing unit receives and processes the captured image to determine space configuration of a scene. The user interface receives a position of a fiducial point inputted by a user. The rendering device superimposes a fiducial mark at the position of the fiducial point on the captured image. The rendering device superimposes a first computer-generated image representing a sensor at an install height above the fiducial point and on a wall of the captured image.

DETAILED DESCRIPTION OF THE INVENTION

Figure 1:
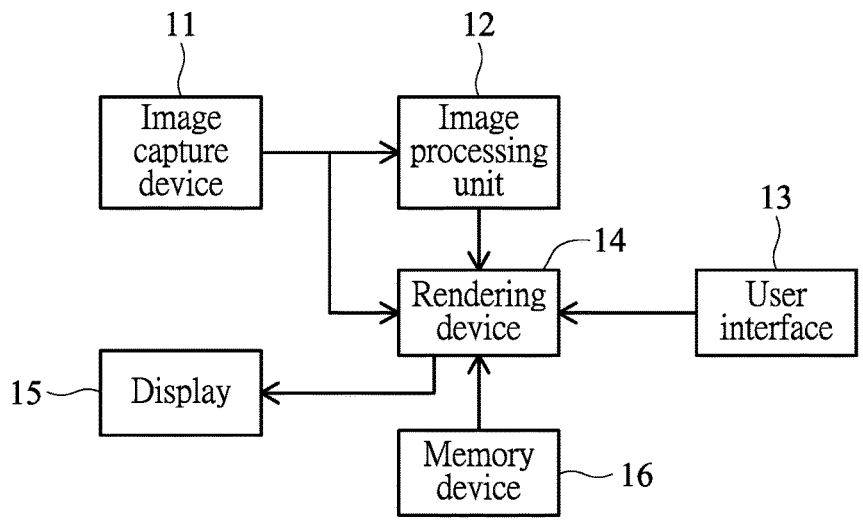
FIG. 1 shows a block diagram illustrating an augmented-reality (AR) system according to one embodiment of the present invention.
Figure 2:
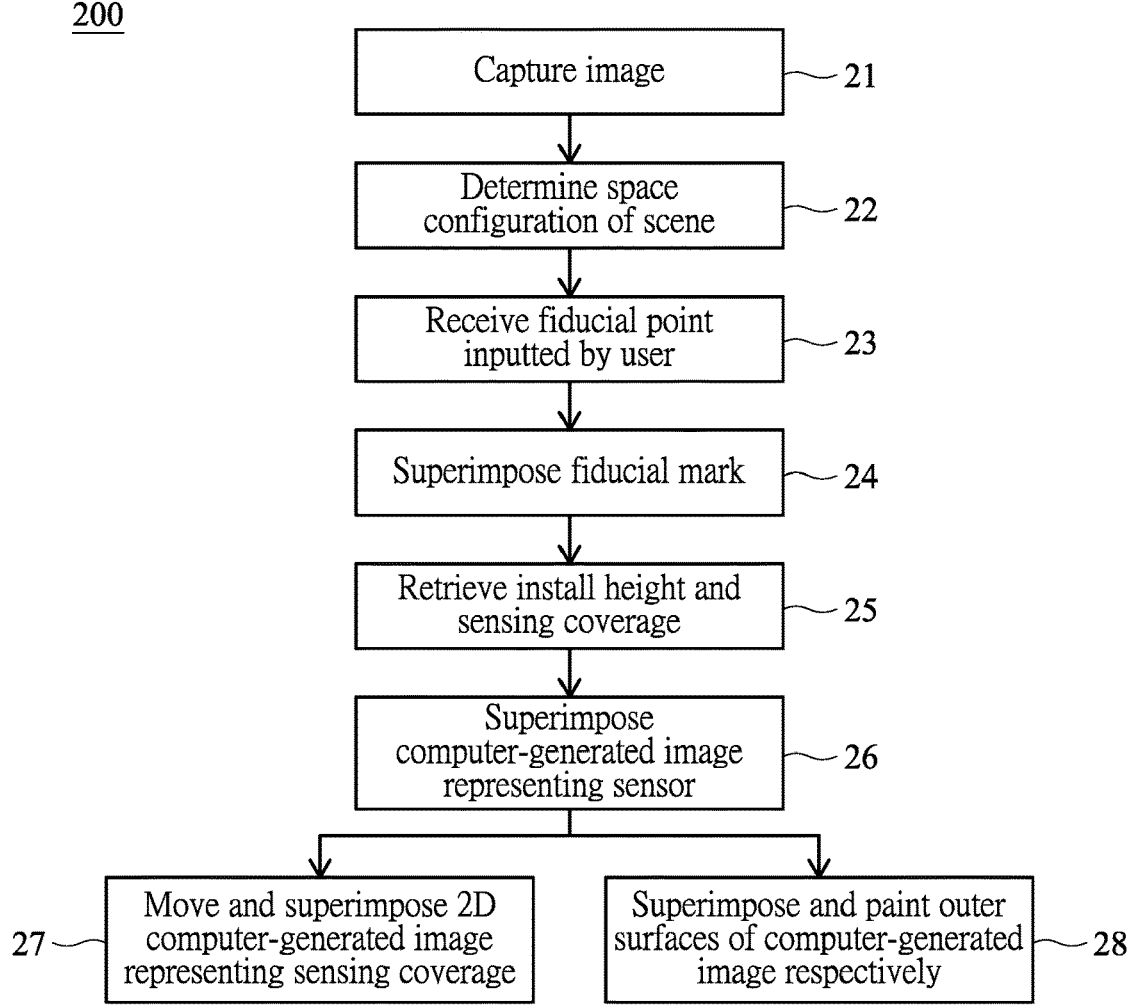
FIG. 2 shows a flow diagram illustrating an AR method according to one embodiment of the present invention.

FIG. 1 shows a block diagram illustrating an augmented-reality (AR) system 100 adaptable to installing a sensor with enhanced user experience according to one embodiment of the present invention. FIG. 2 shows a flow diagram illustrating an AR method 200 according to one embodiment of the present invention. The AR system 100 and the AR method 200 may be adapted to a mobile device (such as tablet computer or mobile phone) or an AR device (such as head-mounted display or smart glasses). The sensor of the embodiment may be, but not limited to, an infrared (IR) sensor, a millimeter wave (mmWave) sensor or a light detection and ranging (LiDAR) device.

In the embodiment, the AR system 100 may include an image capture device 11 configured to capture an image (step 21). The AR system 100 may also include an image processing unit 12 operatively coupled to receive and process the captured image, according to which space configuration of a scene may be determined (step 22). In the embodiment, the space configuration of the scene may include at least one wall and a floor.

According to one aspect of the embodiment, the AR system 100 may include a user (input) interface 13 (for example, touch screen) configured to receive a position of a fiducial point inputted by a user. The fiducial point is located near an intersection where the wall and the floor meet, and is representative of an install bottom of the sensor (that is, the position at which the installed sensor projects).

The AR system 100 of the embodiment may include a rendering device 14 configured to superimpose a fiducial mark at the position of the fiducial point on the captured image (step 24), thereby resulting in a superimposed image, which may be displayed on a display 15. If the position of the inputted fiducial point deviates from the intersection of the wall and the floor, the rendering device 14 may superimpose the fiducial mark at a place nearest the intersection of the wall and the floor. The fiducial mark as mentioned above may include a point (representing the fiducial point) and/or other mark (for example, a line segment extended from the fiducial point and along the intersection of the wall and the floor, or a line segment extended from the fiducial point and parallel with wall surface).

The AR system 100 of the embodiment may include a memory device 16 configured to store a plurality of parameters (such as install height and sensing coverage) of sensor models. Subsequently, in step 25, the rendering device 14 retrieves corresponding install height from the memory device 16 according to the sensor model selected by the user. Further, the rendering device 14 superimposes a (first)

computer-generated image (representing the sensor) at an install height above the fiducial point and on the wall of the captured image (step 26), and the superimposed image may then be displayed on the display 15. Accordingly, the AR system 100 may accurately simulate installing the sensor on the wall with enhanced user experience.

Figure 3A:
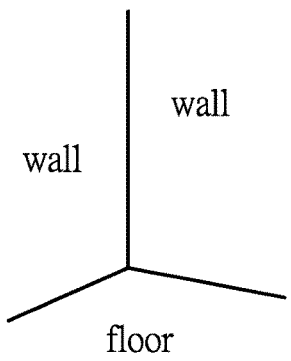
FIG. 3A to FIG. 3C show an example of simulating installing a sensor with a fiducial point located at an intersection where a wall and a floor meet.
Figure 3B:
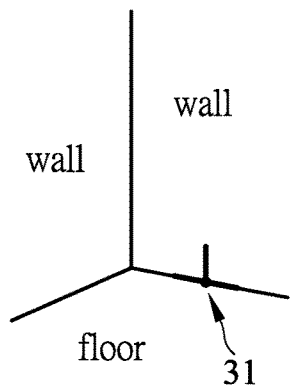
Figure 3C:
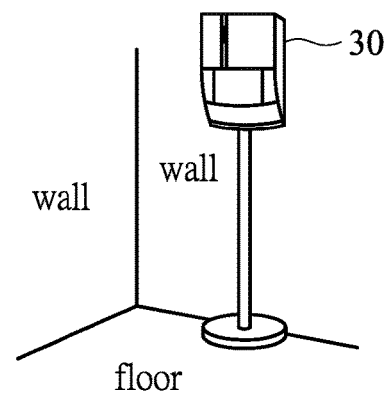

FIG. 3A to FIG. 3C show an example of simulating installing a sensor 30 with a fiducial point 31 located at an intersection where a wall and a floor meet. Specifically, FIG. 3A shows a captured image with space configuration including two walls and a floor. As show in FIG. 3B, a fiducial mark is superimposed at the position of the fiducial point 31 on the captured image, and the fiducial mark includes a point (representing the fiducial point 31), a line segment extended from the fiducial point 31 and along the intersection of the wall and the floor, and a line segment extended from the fiducial point 31 and parallel with wall surface. As shown in FIG. 3C, a computer-generated image (representing the sensor 30) is superimposed at an install height above the fiducial point 31 and on the wall of the captured image.

Figure 4A:
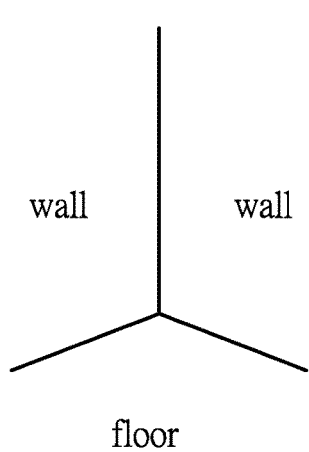
FIG. 4A to FIG. 4C show another example of simulating installing a sensor with a fiducial point located at an intersection where (two) walls and a floor meet.
Figure 4B:
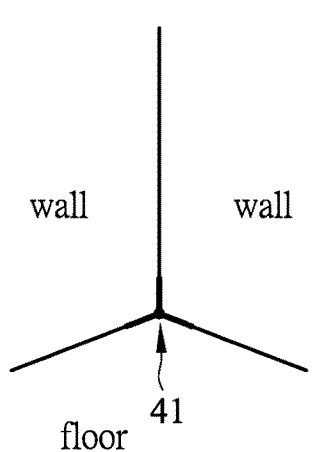
Figure 4C:
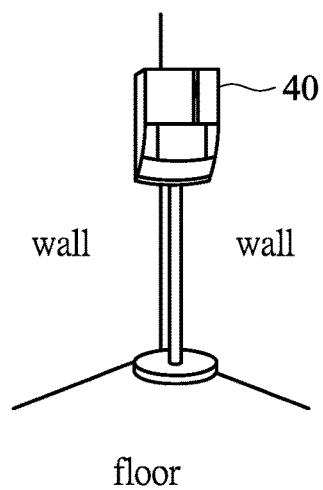

FIG. 4A to FIG. 4C show another example of simulating installing a sensor 40 with a fiducial point 41 located at an intersection where (two) walls and a floor meet. Specifically, FIG. 4A shows a captured image with space configuration including two walls and a floor. As show in FIG. 4B, a fiducial mark is superimposed at the position of the fiducial point 41 on the captured image, and the fiducial mark includes a point (representing the fiducial point 41), a line segment extended from the fiducial point 41 and along the intersection of the two walls, and (two) line segments respectively extended from the fiducial point 41 and along the intersections of the wall and the floor. As shown in FIG. 4C, a computer-generated image (representing the sensor 40) is superimposed at an install height above the fiducial point 41 and on the wall of the captured image.

Figure 5A:
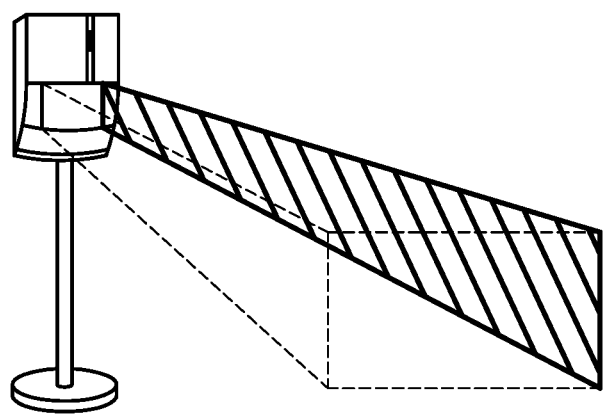
FIG. 5A to FIG. 5C show an example of generating and moving a two-dimensional computer-generated image in sequence within the sensing coverage by the rendering device at three time points.
Figure 5B:
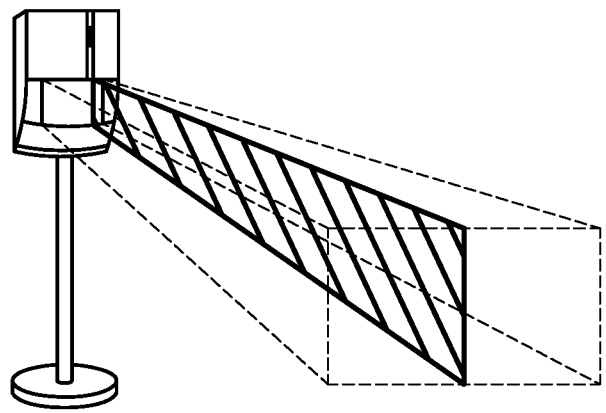
Figure 5C:
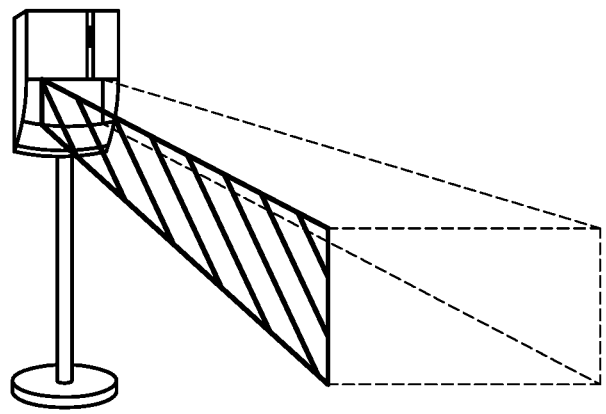

According to another aspect of the embodiment, the rendering device 14 receives corresponding (three-dimensional or 3D) sensing coverage from the memory device 16 according to the sensor model selected by the user (step 25). Next, in step 27, the rendering device 14 accordingly generates a two-dimensional (second) computer-generated image representing (sectional) sensing coverage, which is moved in sequence (for example, from left to right or from top to bottom) within the sensing coverage and superimposed on the captured image, thereby resulting in 3D animation. Accordingly, the user may perceive relevance between the install position and sensing coverage before the sensor is physically installed, thereby enhancing user experience of installing the sensor. FIG. 5A to FIG. 5C show an example of generating and moving a two-dimensional computer-generated image in sequence within the sensing coverage by the rendering device 14 at three time points.

Figure 6:
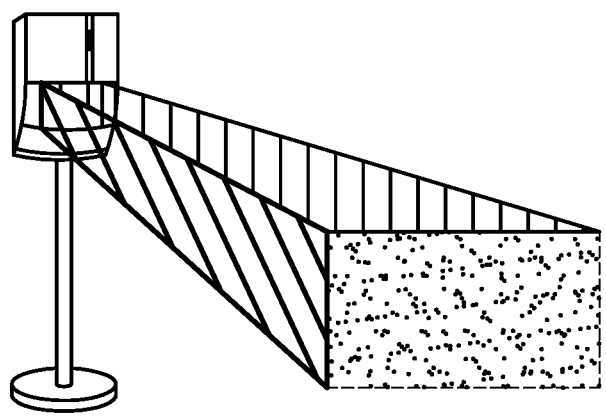
FIG. 6 shows an example of generating a computer-generated image having outer surfaces representing the sensing coverage by the rendering device.

According to another embodiment, the rendering device 14 may generate a (third) computer-generated image representing outer surfaces of (entire) sensing coverage, for example, with a shape of a cone or pyramid, superimposed on the captured image according to the retrieved (3D) sensing coverage (step 28). Particularly, the rendering device 14 paints the outer surfaces of the computer-generated image (that is, outer surfaces of the sensing coverage) with one or more colors. For example, the outer surfaces are painted with different colors, respectively. Accordingly, the user may further perceive relevance between the install position and sensing coverage, thereby enhancing user experience of installing the sensor. Painting on the outer surfaces of the sensing coverage may be selected or set by the user via the user interface 13. FIG. 6 shows an example of generating a computer-generated image having outer surfaces representing the sensing coverage by the rendering device 14.

Although specific embodiments have been illustrated and described, it will be appreciated by those skilled in the art that various modifications may be made without departing from the scope of the present invention, which is intended to be limited solely by the appended claims.

What is claimed is:

1. An augmented-reality system, comprising:
   an image capture device that obtains a captured image;
   an image processing unit that receives and processes the captured image to determine space configuration of a scene;
   a user interface that receives a position of a fiducial point inputted by a user; and
   a rendering device that superimposes a fiducial mark at the position of the fiducial point on the captured image;
   wherein the rendering device superimposes a first computer-generated image representing a sensor installed at a height above the fiducial point and on a wall of the captured image;
   wherein the rendering device superimposes a three-dimensional sensing coverage of the sensor on the captured image.

2. The system of claim 1, wherein the sensor comprises an infrared sensor, a millimeter wave sensor or a light detection and ranging device.

3. The system of claim 1, wherein the space configuration of the scene comprises at least one wall and a floor.

4. The system of claim 3, wherein the fiducial point is located near an intersection where the wall and the floor meet.

5. The system of claim 1, wherein the user interface comprises a touch screen.

6. The system of claim 1, wherein the fiducial mark comprises at least one of the following:
   a point representing the fiducial point;
   a line segment extended from the fiducial point and along an intersection of a wall and a floor; and
   a line segment extended from the fiducial point and parallel with wall surface.

7. The system of claim 1, further comprising a memory device that stores a plurality of parameters of sensor models for providing to the rendering device.

8. The system of claim 1, further comprising a display for displaying the captured image, the fiducial mark and the first computer-generated image.

9. The system of claim 1, wherein the rendering device generates a two-dimensional second computer-generated image representing a part of sensing coverage, which moves in sequence within the sensing coverage and is superimposed on the captured image, thereby resulting in three-dimensional animation.

10. The system of claim 1, wherein the rendering device generates a third computer-generated image representing outer surfaces of sensing coverage superimposed on the captured image according to the sensing coverage of the sensor, and the outer surfaces are painted with different colors.

11. An augmented-reality method, comprising:
   obtaining a captured image;
   receiving and processing the captured image to determine space configuration of a scene;
   receiving a position of a fiducial point inputted by a user;
   superimposing a fiducial mark at the position of the fiducial point on the captured image; and superimposing a first computer-generated image representing a sensor installed at a height above the fiducial point and on a wall of the captured image;

wherein a three-dimensional sensing coverage of the sensor is rendered and superimposed on the captured image.

12. The method of claim 11, wherein the sensor comprises an infrared sensor, a millimeter wave sensor or a light detection and ranging device.

13. The method of claim 11, wherein the space configuration of the scene comprises at least one wall and a floor.

14. The method of claim 13, wherein the fiducial point is located near an intersection where the wall and the floor meet.

15. The method of claim 11, wherein the position of the fiducial point is inputted via a touch screen.

16. The method of claim 11, wherein the fiducial mark comprises at least one of the following:

a point representing the fiducial point;

a line segment extended from the fiducial point and along an intersection of a wall and a floor; and a line segment extended from the fiducial point and parallel with wall surface.

17. The method of claim 11, further comprising storing a plurality of parameters of sensor models for generating the first computer-generated image.

18. The method of claim 11, further comprising displaying the captured image, the fiducial mark and the first computer-generated image on a display.

19. The method of claim 11, further comprising generating a two-dimensional second computer-generated image representing sensing coverage, which moves in sequence within the sensing coverage and is superimposed on the captured image, thereby resulting in three-dimensional animation.

20. The method of claim 11, further comprising generating a third computer-generated image representing outer surfaces of sensing coverage superimposed on the captured image according to the sensing coverage of the sensor, and painting the outer surfaces with different colors.

* * * * *